United States Patent
Asano et al.

(10) Patent No.: US 6,933,897 B2
(45) Date of Patent: Aug. 23, 2005

(54) MOBILE COMMUNICATIONS ANTENNA AND TRANSCEIVING APPARATUS

(75) Inventors: Takeshi Asano, Atsugi (JP); Shohhei Fujio, Machida (JP)

(73) Assignee: Lenovo (Singapore) PTE LTD, Singapore (SG)

( * ) Notice: Subject to any disclaimer, the term of this patent is extended or adjusted under 35 U.S.C. 154(b) by 2 days.

(21) Appl. No.: 10/783,758

(22) Filed: Feb. 20, 2004

(65) Prior Publication Data

US 2004/0227674 A1 Nov. 18, 2004

(30) Foreign Application Priority Data

Feb. 21, 2003 (JP) ........................................ 2003-043594

(51) Int. Cl.[7] .............................................. H01Q 1/24
(52) U.S. Cl. ........................ 343/702; 343/715; 343/846
(58) Field of Search ................................ 343/715, 702, 343/846, 848, 830, 900

(56) References Cited

U.S. PATENT DOCUMENTS

| | | | | |
|---|---|---|---|---|
| 6,172,646 | B1 | * | 1/2001 | Kawahata et al. .......... 343/702 |
| 6,724,348 | B2 | * | 4/2004 | Fang .......................... 343/702 |
| 6,853,336 | B2 | * | 2/2005 | Asano et al. ............... 343/702 |
| 2005/0073462 | A1 | * | 4/2005 | Lin et al. .................... 343/702 |

* cited by examiner

*Primary Examiner*—Tan Ho
(74) *Attorney, Agent, or Firm*—Scott W. Reid

(57) ABSTRACT

An antenna apparatus has a rod-shaped antenna element and a feeding part to feed electronic signals to, and receive electronic signals from, the antenna element. The antenna apparatus comprises a first ground plane that is provided parallel to and near the antenna element and that is located to serve as a background to electromagnetic waves radiating from the antenna element in at least one direction. The antenna apparatus also comprises at least a second ground plane that is provided parallel to and near the antenna element and in a direction different from that of the first ground plane.

20 Claims, 4 Drawing Sheets

[Figure 1]
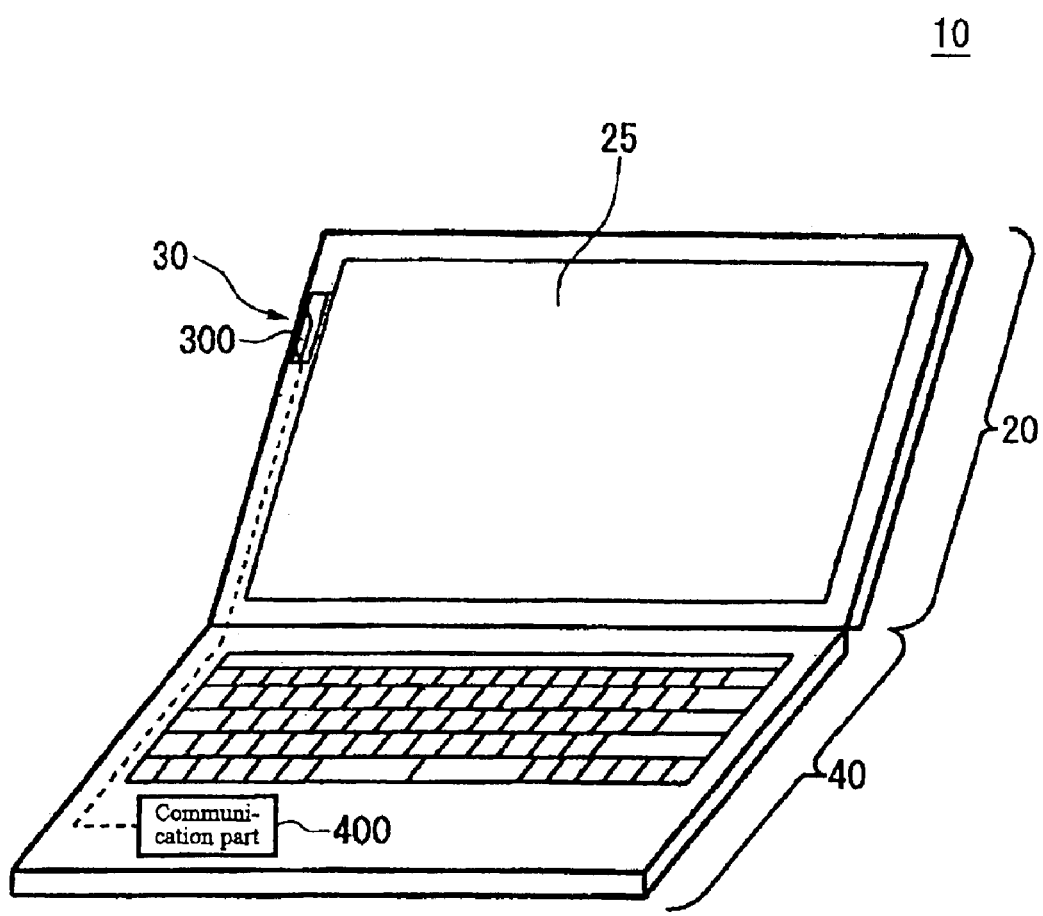

[Figure 2]
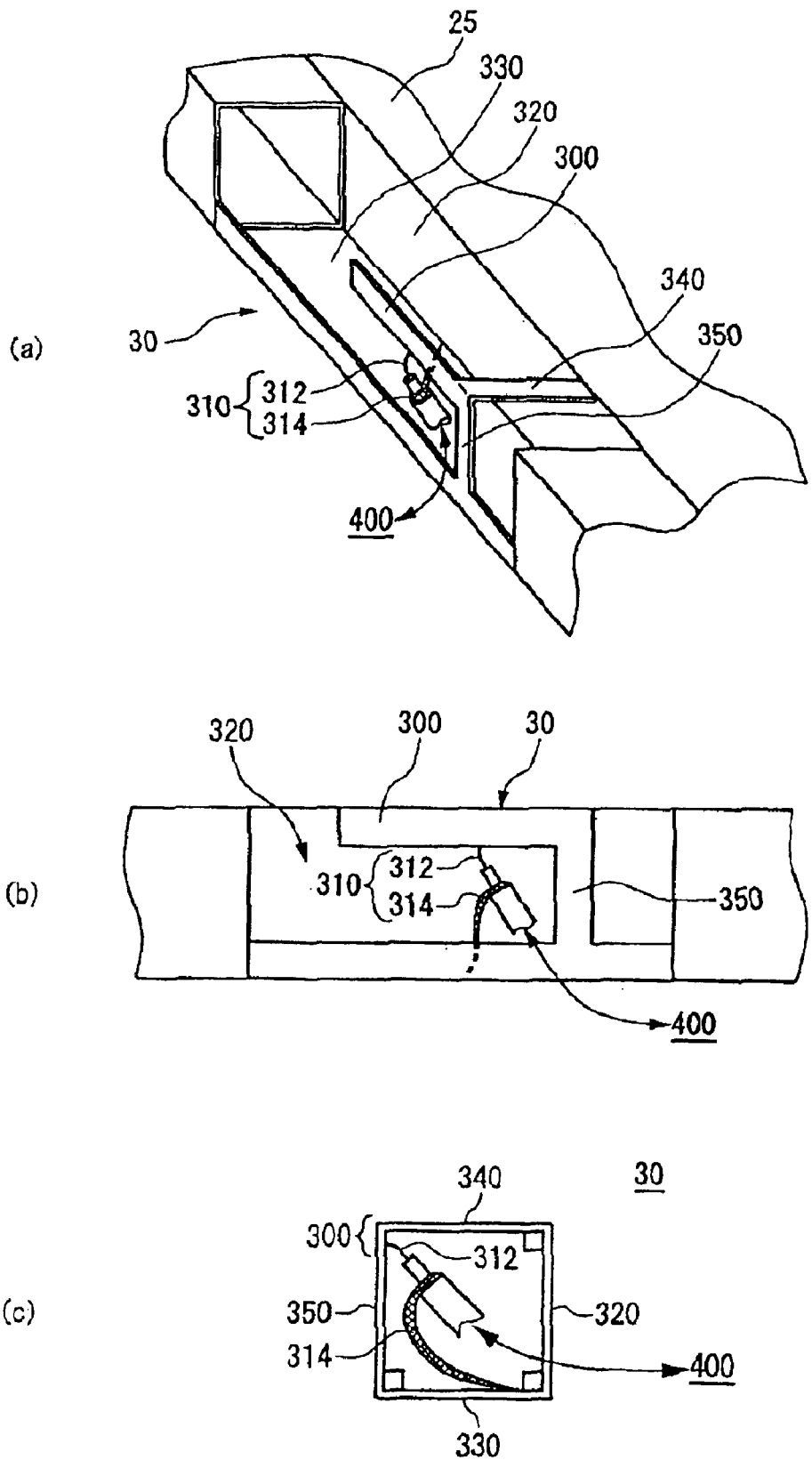

[Figure 3]
(a)
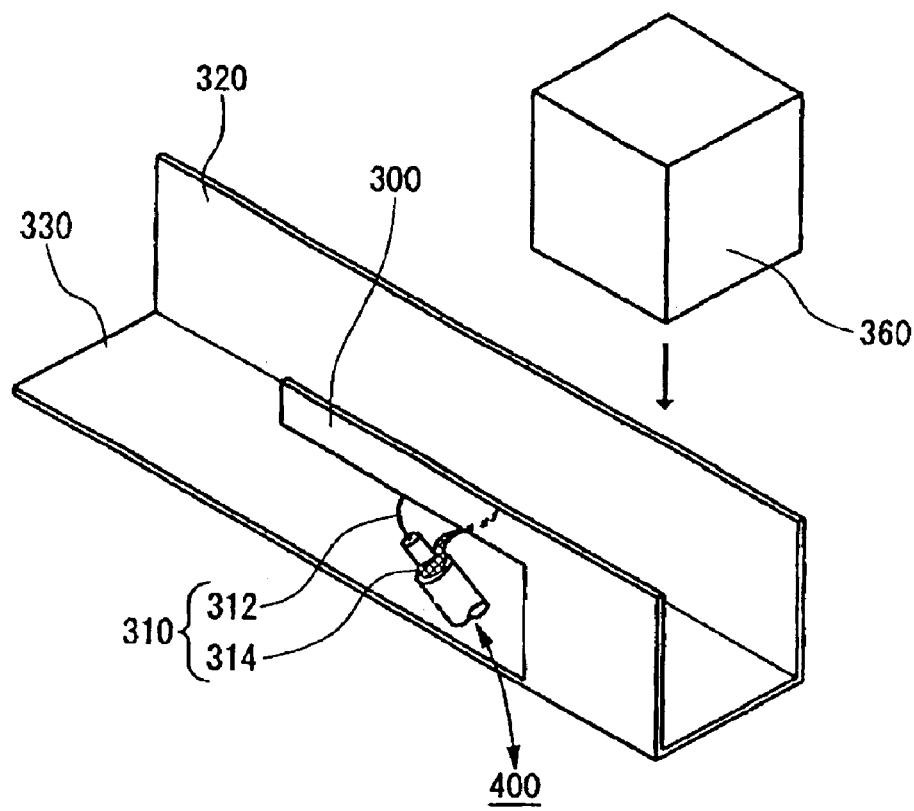
(b)
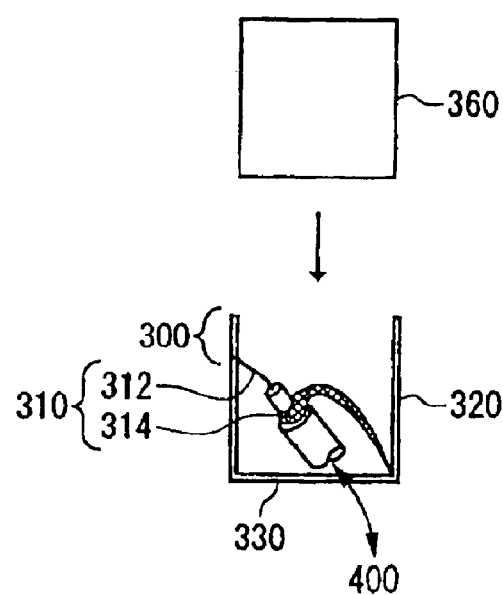

[Figure 4]
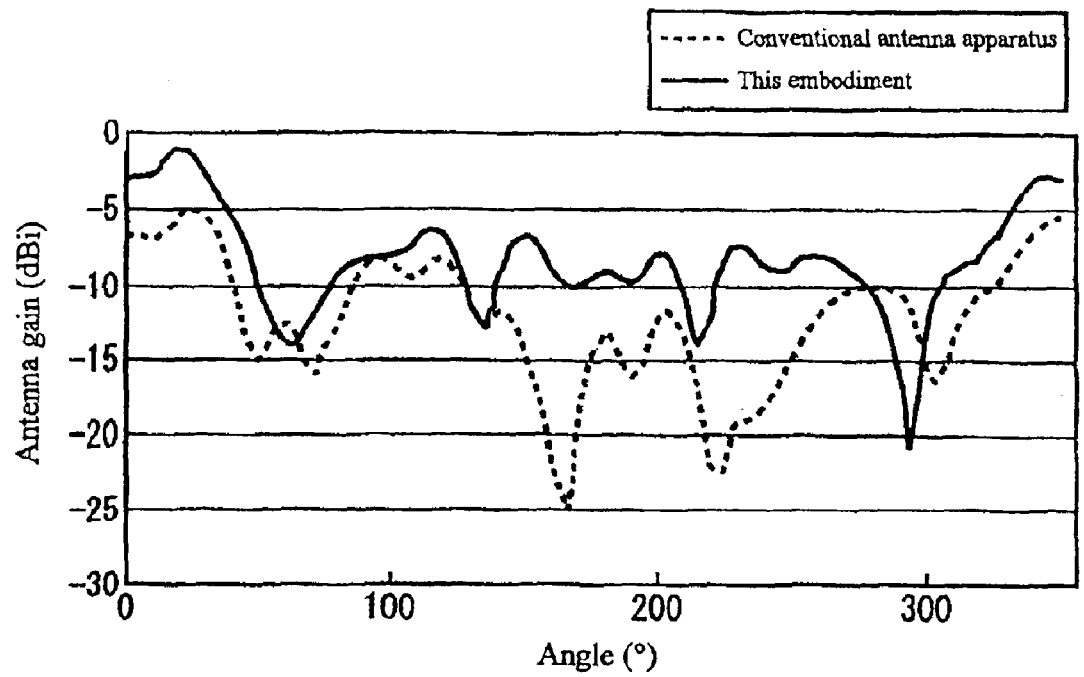
[Figure 5]
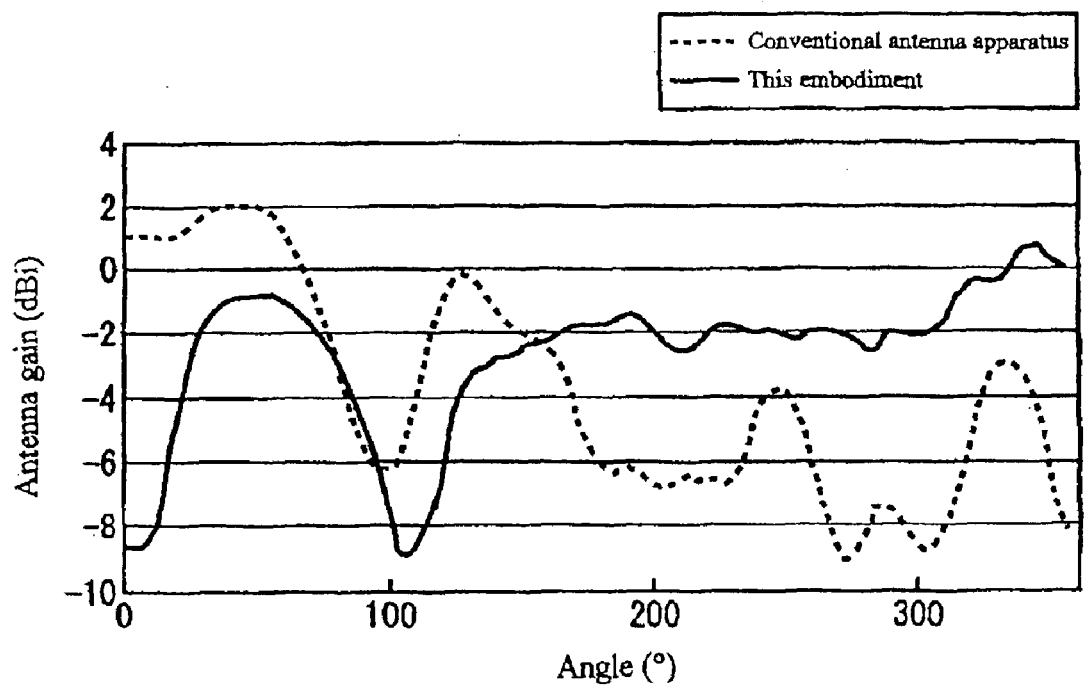

MOBILE COMMUNICATIONS ANTENNA AND TRANSCEIVING APPARATUS

BACKGROUND OF THE INVENTION

1. Field of the Invention

The present invention relates to an antenna apparatus and the accompanying transmitting and receiving apparatus. More particularly, the present invention relates to an improved small antenna, and transmitting and receiving apparatus, for use with a mobile communication terminal.

2. Background

Conventionally, inverted F-type antennas have been used in mobile communications terminals. These types of antennas may be small and may provide for easy adjustment of impedance. Examples of such antennas are described in Published Unexamined Patent Application No. 11-154815 which is hereby incorporated by reference in its entirety for the purpose of background education.

However, if there is a conductor or a dielectric material located in the direction of the electromagnetic wave radiation transmission or receipt, an inverted F-type antenna often cannot satisfactiorily perform its antenna functions. Especially, for mobile communication terminals, position and space for placing an antenna apparatus are limited and various metals and dielectric materials are placed near the antenna apparatus, so that it can be difficult for the antenna to perform satisfactorily.

It is therefore an object of the present invention to provide an antenna apparatus, and accompanying transmitting and receiving apparatus, which can solve the above-described problems. This purpose is achieved by combinations of characteristics described in the independent claims appended hereto. In addition, appended dependent claims describe further advantageous embodiments of the present invention.

SUMMARY OF THE INVENTION

According to a first embodiment of this invention, an antenna apparatus, and a transmitting and receiving apparatus accompanying the antenna apparatus, comprising a rod-shaped antenna element, a feeding part to feed signals to the antenna element, a first ground plane that is provided parallel to and near the antenna element behind a radiating direction in which the antenna element radiates electromagnetic waves, and a second ground plane that is provided parallel to and near the antenna element and which is oriented in a direction different from that of the first ground plane, are provided.

In the above-described summary of this invention, all characteristics necessary for this invention are not listed, and subcombinations of these characteristics may embody the present invention.

BRIEF DESCRIPTION OF THE DRAWINGS

Embodiments of the present invention will be described in some detail in the following specification and with reference to the following figures in which like elements are referred to using like reference numbers and in which:

FIG. 1 is a perspective view of a transmitting and receiving apparatus in accordance with an embodiment of the present invention;

FIG. 2(a) is a perspective view of an antenna apparatus in accordance with an embodiment of the present invention;

FIG. 2(b) is a front view of the antenna apparatus of FIG. 2(a);

FIG. 2(c) is a side view of the antenna apparatus of FIG. 2(a);

FIG. 3(a) is a perspective view of an antenna apparatus in accordance with an alternate embodiment of the present invention;

FIG. 3(b) is a side view of the antenna apparatus of FIG. 3(a);

FIG. 4 is a graph indicating the antenna gain of an antenna apparatus embodying the present invention when the main body of the transmitting and receiving apparatus is closed; and FIG. 5 is a graph indicating the antenna gain of an antenna apparatus embodying the present invention when the main body of the transmitting and receiving apparatus is opened.

DETAILED DESCRIPTION OF EMBODIMENTS OF THE PRESENT INVENTION

Hereinafter, the present invention will be explained by way of description of exemplary embodiments, however, these embodiments should not be read as limiting the invention's scope which shall be delineated solely by the claims appended hereto. In addition, all combinations of characteristics explained in these embodiments are not necessary for each implementation of the invention.

FIG. 1 shows a schematic view of a transmitting and receiving apparatus 10 embodying the present invention. The transmitting and receiving apparatus 10 has a display part 20 having a display panel 25 to display information to users, an antenna apparatus 30 provided on the side of the display panel 25, and a main body part 40 connected to the display panel 25 so as to be opened or closed. The transmitting and receiving apparatus 10 may communicate wirelessly with other wireless components when the main body part 40 is open or closed.

The antenna apparatus 30 includes an antenna element 300 that radiates and receives electromagnetic waves, and is used by the transmitting and receiving apparatus 10 to communicate with other wireless apparatus. The main body part 40 includes a communication part 400, which communicates using electromagnetic energy that is fed to the antenna element 300 or which the antenna element 300 receives from the outside. In addition, the main body part 40 is connected to the display panel 25 so as to be opened and closed, and the display panel 25 is shielded from the outside when it is closed.

FIG. 2(a) shows a perspective view of the antenna apparatus 30, and FIG. 2(b) shows a front view of the antenna apparatus 30. In addition, FIG. 2(c) shows a side view of the antenna apparatus 30. The antenna apparatus 30 is an antenna apparatus which may be used for wireless communication in accordance with wireless communications standards such as Bluetooth, among others, and has an antenna element 300, a feeding part 310 that connects a communication part 400 to the antenna element 300, a first ground plane 320, a second ground plane 330, a first ground connection part 340 and a second ground connection part 350.

The antenna element 300 is a rod-shaped plane, and the plane of the antenna element 300 is largely parallel with the side of the display panel 25. With this arrangement, the capacitance which occurs between the antenna element 300 and a plane-shaped conductor provided on the display panel 25, e.g., a ground electrode in the case that the display panel 25 is an LCD panel, can be reduced. In addition, if the main body part 40 is closed, the capacitance which occurs when a conductor of the metal case that constitutes the main body part 40 is positioned near the antenna element 300, can be reduced.

The feeding part 310 has a core-wire 312 and a shield part 314. The core-wire 312 feeds to a feeding point of the antenna element 300 which is not on an edge of the antenna element 300. For example, the core-wire 312 feeds to a feeding point which is separated from an edge of the antenna element 300 by a predetermined interval, so that impedance of the antenna apparatus 30 is adjusted to a predetermined impedance of a cable that connects the antenna apparatus 30 and the communication part 400.

The shield part 314 is a braided component, which shields electric and magnetic fields that the core-wire 312 receives from the outside, and is connected on a tangent line of the first ground plane 320 and the second ground plane 330. This orientation helps make the radiation of electromagnetic waves approximately the same for when the radiation is in a direction away from (or primarily approximately perpendicular to) the first ground plane 320 as when the radiation is in a direction away from the second ground plane 330.

The feeding part 310 is provided in a perpendicular direction in relation to the first ground plane 320 and from the opposite side of the tangent line in the first ground plane 320 with the second ground plane 330, and provided in a perpendicular direction in relation to the second ground plane 330 and from the opposite side of the tangent line in the second ground plane 330 with the first ground plane 320. Therefore, the antenna apparatus 30 has a necessary minimum ground plane behind (or as a background to) a radiating direction of the electromagnetic waves from the antenna element 300. This enables the antenna apparatus 30 to be minimized in size, so that the antenna apparatus 30 can be placed in a smaller space of the side of display panel 25.

The first ground plane 320 is provided behind (or oriented as a background to) a radiating direction, in which the antenna element 300 radiates electromagnetic waves, so as to be parallel to and near the antenna element 300. The separation may be a distance of ¼ wavelength or less of the electromagnetic waves radiated by the antenna element 300, or preferably, a distance of ⅛ wavelength or less. More preferably, it may be a distance of 1/16 wavelength or less. As one example, the first ground plane 320 is provided at a distance of from 2 to 3 mm from the antenna element 300.

The second ground plane 330 is provided behind (or oriented as a background to) a radiating direction, in which the antenna element 300 radiates electromagnetic waves, so as to be parallel to and near the antenna element 300, however, its normal direction is different from that of the first ground plane 320. For example, it is preferable that the second ground plane 330 is approximately perpendicular to the first ground plane 320. This enables the antenna apparatus 30 to effectively radiate electromagnetic waves through a wide range of directions with one or both of the first ground plane 320 and the second ground plane 330 serving as a background to the radiation.

In addition, it is preferable that the distance between the first ground plane 320 and the antenna element 300 is approximately the same as that between the second ground plane 330 and the antenna element 300. This helps create similar transmission and reception properties of the antenna element 300 in each direction.

The first ground connection part 340 connects an edge of the antenna element 300 to the first ground plane 320. The second ground connection part 350 connects an edge of the antenna element 300, e.g., the edge connected to the first ground plane 320, to the second ground plane 330. Therefore, the antenna apparatus 30 has a structure of two combined inverted F-type antennas having mutually different orientations. Alternatively, the antenna apparatus 30 may also have a structure of two combined two L-shaped antennas having mutually different orientations. Therefore, the core-wire 312 may also feed to an edge of the antenna element 300.

As described above, the antenna apparatus 30 effectively radiates electromagnetic waves in directions such that each of the first ground plane 320 and the second ground plane 330 serves as the background (that is, away from each ground plane). For example, if the main body part 40 is closed and radiation of electromagnetic waves in directions away from the second ground plane 330 is blocked, the antenna apparatus 30 can communicate with the outside through radiation of electromagnetic waves in directions away from the first ground plane 320.

FIG. 3($a$) shows a perspective view of the antenna apparatus 30 in an alternate embodiment of the present invention. FIG. 3($b$) shows a side view of the alternate embodiment of the antenna apparatus 30. The antenna apparatus 30 in this example further comprises an elastic body part 360 connected to an edge of the antenna element 300. In addition, the antenna apparatus 30 may not have the first ground connection part 340 and the second ground connection part 350. Otherwise, the antenna apparatus 30 of this embodiment is the same as that described above and shown in FIG. 2. The discussion below will further describe the elements of this alternate embodiment which differ from the embodiment already discussed.

The elastic body part 360 is an elastic body in the shape of a rectangular parallelepiped, the perimeter of which is made of a conductive material and the inside of which is made so as to be non-conductive; such as an EMI gasket. By contacting a surface of the elactic body part 360 to the first ground plane 320, the elastic body part 360 connects an edge of the antenna element 300 to the first ground plane 320. In addition, by contacting another surface of the elastic body part 360 to the second ground plane 330, the elastic body part 360 connects an edge of the antenna element 300 to the second ground plane 330.

In addition, as a further example, the elastic body part 360 may comprise a cube which has a side of a length that is approximately the same as the distance between the antenna element 300 and the first ground plane 320. By being pressed downwardly between the antenna element 300 and the first ground plane 320, the elastic body part 360 is attached.

Alternatively, the elastic body part 360 may also be a cube which has a side somewhat longer than the distance between the antenna element 300 and the first ground plane 320. In this case, by being pressed downwardly, the length of the side of the elastic body part 360 is compressed to the distance between the antenna element 300 and the first ground plane 320. With this method, the elastic body part 360 can more securely be attached between the antenna element 300 and the first ground plane 320.

In accordance with this alternate embodiment of the present invention, variation of antenna properties in the manufacturing process can be reduced and manufacturing costs can be decreased, as compared to the embodiment discussed above. For example, according to the embodiment shown in FIG. 2, if the first ground connection part 340, which is made of metals and other materials, is formed by stamping, errors in length or width may occur. In addition, if the first ground connection part 340 is attached to the antenna element 300 by welding or soldering, errors may occur at the attachment position. In the event of such errors, the antenna apparatus 30 may exhibit performance properties different from those intended by the design. In contrast, in accordance with the alternate embodiment, for example, the elastic body part 360 is attached by being pressed downwardly between the antenna element 300 and the first ground plane 320. Therefore, if the first ground plane 320 is attached to the antenna element 300, it is unlikely that attachment errors will occur. Furthermore, compared with welding or soldering, attachment by pressing downwardly is low in manufacturing costs.

FIG. 4 illustrates antenna gain of the antenna apparatus 30 when the main body part 40 is closed. Specifically, this figure shows antenna gain in different directions in a horizontal plane with the solid line illustrating gain when the transmitting and receiving apparatus 10 is leaned forward 45 degrees from the horizontal plane. The dotted line illustrates antenna gain using a conventional antenna apparatus instead of the antenna apparatus 30 of the present invention. As is clear from this figure, antenna gain of the antenna apparatus 30 is higher than that of the conventional antenna in almost all angles. Additionally, the antenna gain experienced using the antenna apparatus 30 of embodiments of the present invention is more constant across different angles in the horizontal plane than is the gain experienced utilizing a conventional antenna apparatus.

For clarity, a conventional antenna apparatus is assumed to have, for example, a structure in which the first ground plane 320 and the first ground connection part 340 are removed from the antenna apparatus 30 shown in the present invention.

FIG. 5 illustrates antenna gain of the antenna apparatus 30 when the main body part 40 is opened. Specifically, this figure shows antenna gain in different directions in a horizontal plane with the solid line illustrating the gain experienced when the main body part 40 is opened perpendicular to the display panel 25 and the transmitting and receiving apparatus 10 is placed horizontally. The dotted line illustrates antenna gain using a conventional antenna apparatus under the same circumstances instead of the antenna apparatus 30 of the present invention. As is clear from this figure, the antenna gain of the antenna apparatus 30 is higher than that of the conventional antenna in almost all angles.

As is clear from the above description, since the antenna apparatus 30 radiates electromagnetic waves such that each of the first ground plane 320 and the second ground plane 330 serves as a background, the antenna apparatus 30 can effectively communicate with the outside when the main body part 40 is either opened or closed.

The present invention has been explained in some detail be describing one or more exemplary embodiments. However, it is to be understood that the scope of the present invention is not restricted to the range of the above-described embodiments. Those skilled in the relevant arts will readily recognize that various changes or modifications may be made to the described embodiments without departing from the scope and spirit of the present invention.

What is claimed is:

1. An antenna apparatus, comprising:
   a rod-shaped antenna element;
   a feeding part to feed electronic signals to, and receive electronic signals from, said antenna element;
   a first ground plane near said antenna element and oriented approximately parallel to said antenna element so as to serve as a background to at least one direction in which said antenna element radiates electromagnetic waves, and;
   a second ground plane near said antenna element and oriented approximately parallel to said antenna element and in a different direction from said first ground plane.

2. The antenna apparatus according to claim 1, further comprising:
   a first ground connection part to connect an edge of said antenna element to said first ground plane; and
   a second ground connection part to connect said edge of said antenna element to said second ground plane, wherein
   said feeding part feeds to a feeding point on said antenna element which is not located on said edge.

3. The antenna apparatus according to claim 1, further comprising:
   an elastic body part connected to said edge of said antenna element, the shape of which elastic body part is a rectangular parallelepiped having conductive surfaces and a non-conductive interior, and, wherein;
   a first surface of the elastic body part contacts said first ground plane and a second surface of the elastic body part contacts said second ground plane.

4. The antenna apparatus according to claim 1, wherein said feeding part comprises;
   a core-wire to feed to said antenna element, and;
   a shield part, which is connected on a tangent line of said first ground plane and said second ground plane and which shields said core wire from electromagnetic fields.

5. The antenna apparatus according to claim 1, wherein;
   a distance between said first ground plane and said antenna element is approximately the same as a distance between said second ground plane and said antenna element.

6. The antenna apparatus according to claim 1, wherein a distance between said first ground plane and said antenna element is equal to or less than one-fourth a wavelength of the electromagnetic waves primarily received and transmitted by said antenna apparatus.

7. The antenna apparatus according to claim 6, wherein;
   a distance between said second ground plane and said antenna element is approximately the same as said distance between said first ground plane and said antenna element.

8. The antenna apparatus according to claim 1, wherein said first ground plane is approximately perpendicular to said second ground plane.

9. The antenna apparatus according to claim 8, wherein said antenna element is provided in a perpendicular direction to said first ground plane from the opposite side of a tangent line in said first ground plane with said second ground plane, and provided in a perpendicular direction to said second ground plane from the opposite side of a tangent line in said second ground plane with said first ground plane.

10. The antenna apparatus according to claim 1, further comprising:
    a transmitting and receiving apparatus for communicating wirelessly and comprising a display panel for displaying information to users, and wherein;
    said antenna element comprises a rod-shaped plane located in said transmitting and receiving apparatus and oriented such that the plane of said antenna element and a side of said display panel are parallel.

11. A transmitting and receiving apparatus, comprising:

a rod-shaped antenna element;

a feeding part to feed electronic signals to, and receive electronic signals from, said antenna element;

a first ground plane near said antenna element and oriented approximately parallel to said antenna element so as to serve as a background to at least one direction in which said antenna element radiates electromagnetic waves;

a second ground plane near said antenna element and oriented approximately parallel to said antenna element and in a different direction from said first ground plane, and;

a communication part for performing radio communications using electronic signals fed to said antenna element and/or received by said antenna element from an outside source.

12. The transmitting and receiving apparatus according to claim 11, further comprising:

a first ground connection part to connect an edge of said antenna element to said first ground plane; and a second ground connection part to connect said edge of said antenna element to said second ground plane, wherein said feeding part feeds to a feeding point on said antenna element which is not located on said edge.

13. The transmitting and receiving apparatus according to claim 11, further comprising:

a display panel for displaying information to users; and a main body part hingedly connected to said display panel such that the main body-display panel assembly may be moved between opened and closed positions and such that said display panel is shielded from the outside when the assembly is in the closed position, wherein;

said antenna element comprises a rod-shaped plane oriented such that a long axis of said antenna element is approximately parallel with a side of said display panel and perpendicular to a shielding plane that shields said display panel in said main body part.

14. The transmitting and receiving apparatus according to claim 11, wherein said antenna element is provided in a perpendicular direction to said first ground plane from the opposite side of a tangent line in said first ground plane with said second ground plane, and provided in a perpendicular direction to said second ground plane from the opposite side of a tangent line in said second ground plane with said first ground plane.

15. The transmitting and receiving apparatus according to claim 11, wherein said feeding part comprises;

a core-wire to feed to said antenna element, and;

a shield part, which is connected on a tangent line of said first ground plane and said second ground plane and which shields said core wire from electromagnetic fields.

16. The transmitting and receiving apparatus according to claim 11, wherein a distance between said first ground plane and said antenna element is approximately the same as a distance between said second ground plane and said antenna element.

17. The antenna apparatus according to claim 11, wherein a distance between said first ground plane and said antenna element is equal to or less than one-fourth a wavelength of the electromagnetic waves primarily received and transmitted by said antenna apparatus.

18. The antenna apparatus according to claim 17, wherein;

a distance between said second ground plane and said antenna element is approximately the same as said distance between said first ground plane and said antenna element.

19. The transmitting and receiving apparatus according to claim 11, wherein said first ground plane is approximately perpendicular to said second ground plane.

20. The transmitting and receiving apparatus according to claim 11, wherein said antenna element is provided in a perpendicular direction to said first ground plane from the opposite side of a tangent line in said first ground plane with said second ground plane, and provided in a perpendicular direction to said second ground plane from said opposite side of a tangent line in said second ground plane with said first ground plane.

* * * * *